United States Patent [19]
Brewer et al.

[11] Patent Number: 5,859,975
[45] Date of Patent: *Jan. 12, 1999

[54] PARALLEL PROCESSING COMPUTER SYSTEM HAVING SHARED COHERENT MEMORY AND INTERCONNECTIONS UTILIZING SEPARATE UNDIRECTIONAL REQUEST AND RESPONSE LINES FOR DIRECT COMMUNICATION OR USING CROSSBAR SWITCHING DEVICE

[75] Inventors: Tony Mahlon Brewer; Thomas Lee Watson, both of Dallas; David Michael Chastain, Plano, all of Tex.

[*] Notice: The term of this patent shall not extend beyond the expiration date of Pat. No. 5,577,204.

[73] Assignee: Hewlett-Packard, Co., Palo Alto, Calif.

[21] Appl. No.: 695,266

[22] Filed: Aug. 9, 1996

Related U.S. Application Data

[63] Continuation of Ser. No. 168,531, Dec. 15, 1993, Pat. No. 5,577,204.

[51] Int. Cl.[6] .............................. G06F 13/14; G06F 13/00
[52] U.S. Cl. .................... 395/200.43; 395/311; 395/312; 395/861; 395/200.62
[58] Field of Search ..................................... 395/311, 312, 395/200.3, 800, 200.43, 475, 200.44, 861, 200.46, 200.62, 200.65; 370/63

[56] References Cited

U.S. PATENT DOCUMENTS

| | | | |
|---|---|---|---|
| 5,191,578 | 3/1993 | Lee | 370/63 |
| 5,469,446 | 11/1995 | Fuhs et al. | 371/33 |
| 5,475,858 | 12/1995 | Gupta et al. | 395/800 |
| 5,583,990 | 12/1996 | Birritella et al. | 395/200.01 |

*Primary Examiner*—Thomas C. Lee
*Assistant Examiner*—Rehana Perveen

[57] ABSTRACT

There is disclosed a shared multiprocessing system with several nodes, or processing units, interconnected together for communication purposes by a dual channeled crossbar switch. Several such multichannel crossbar switches can be linked together to form a large cohesive processing system where processing units from one node can access memory from another node on the same crossbar or from another node on a different crossbar. The interconnection between crossbars is accomplished by a circular ring. In operation, the system allows for long memory latencies while not increasing the length of short (local) memory latencies. This is, accomplished by storing the bulk of long latency requests at the local processing unit and only sending the request when there is an actual availability of communication capacity to handle the long latency request.

14 Claims, 5 Drawing Sheets

PARALLEL PROCESSING COMPUTER SYSTEM HAVING SHARED COHERENT MEMORY AND INTERCONNECTIONS UTILIZING SEPARATE UNDIRECTIONAL REQUEST AND RESPONSE LINES FOR DIRECT COMMUNICATION OR USING CROSSBAR SWITCHING DEVICE

CROSS REFERENCE TO RELATED APPLICATION

This is a continuation of application Ser. No. 08/168,531 filed on Dec. 15, 1993 (now U.S. Pat. No. 5,577,204).

TECHNICAL FIELD OF THE INVENTION

This invention relates to memory interconnect systems and more specifically to an interconnect system and method for high band width, low latency data transfers between processor nodes of a multi-nodal processor system and even more specifically to such systems using a directory based cache memory protocol where memories issue requests to processors in response to processors operating at a remote node.

BACKGROUND OF THE INVENTION

Computer systems are now being created which have multiple nodes that communicate over an interconnected network. Some of these systems have multiple processors per node. One system requirement is to have a coherent memory system between the nodes even though each node is a multiprocessor system in and of itself.

In a typical shared multiprocessor (SMP) system only the processors make requests to memory; the memories do not make requests back to processors. However, in a multi-node system other nodes must make requests to a local memory to obtain information from the local memory. It could happen, however, that the data desired by a remote processor could be checked out to the local cache memory. In such a situation, the local memory must make a request to the processor to tell the processor to copy the information back to memory so that it can be used at the requesting node. The problem is to design a system which contains an interconnect mechanism so that memories can talk to processors as well as processors being able to make requests to memory.

A coherent memory system, for purposes of this discussion, is a memory system where if one processor makes an access to memory (either a read or write) then all other processors in the system, if they are actively pursuing that same data, will obtain the most up-to-date copy of the data at all times. In such a situation, the processors will always obtain their data from the local cache on the processor. Thus, if the data is not in its cache, it will be put in the local cache by the node serving the memory containing the desired information.

Noncoherent memory operations are those operations where data goes directly to or from memory and is returned directly back to the processor and never goes through a cache.

One problem occurs when a processor makes an access to memory on its own node. Such an access is fairly quick (small latency) because it's essentially a local memory. If, on the other hand, the processor is accessing another node's memory, the memory access time is fairly long (long latency). The problem is to be sure not to increase the latency of the shorter memory accesses because they have to wait behind accesses to memories at remote nodes.

Another problem exists in such systems when multiple processors within a node have accessed the same piece of memory for read access, and a processor at one of the nodes now wants that data for write access. The requesting processor must be able to inform all other processors efficiently that they must invalidate that data so that the processor requesting write access has sole possession of that data. If this is not accomplished in a very quick manner, the access latency for the write access would become very large thereby slowing the entire system.

Compounding the problem of latency is the fact that before a processor can actually access data from its cache for write purposes, it must be certain that the other processors have completed their invalidation of the data in a weakly ordered consistency model. Thus, the processor making the write access must send invalidates to all of the other processors that have read access and get the responses back before it performs the write operation. This must be accomplished efficiently so that the write access does not take an inordinate length of time.

In addition, the system must be able to guarantee that there is no situation where the system will deadlock because the resource that is required to complete an operation on a first processor is being consumed by a second processor (or another transaction) and that second processor is waiting on resources that the first processor is holding. This condition is a circular deadlock that must be avoided.

A goal for the interconnect between nodes is to provide sufficient bandwidth so that the interconnect is not the limiting performance factor when executing a program. Due to the memory bandwidth requirements of today's processors, this goal will rarely be met. Therefore, an objective of any design is to provide as much bandwidth as possible for the nodal interconnect without violating other constraints (cost, space, power).

SUMMARY OF THE INVENTION

The system that we have designed utilizes a directory-based protocol memory interconnected by a crossbar switch. The crossbar has separate data paths for requests and responses. This structure results in a high bandwidth interconnect in which requests will not block responses.

With separate request and response data paths, before a request is sent out to the crossbar, it is assured that there is space available for the response at the agent of the processor that made the request. Also, the protocol prevents requests, which when received by the destination, from requiring the generation of another request. The combination of the separate data path structure and the protocol rules allows for a deadlock free system.

The crossbar system is designed to have the memories, as well as the processors, make requests and get the responses back accordingly to whichever processor made the request. The system is designed to minimize the latency from a requesting processor to a local memory. However, when memory makes a request to a processor (which occurs much less frequently) that latency is of less consequence to system operation so we are less concerned about higher latency in this aspect of the operation.

The solution that we achieved puts both the memory and one or more local processors on the same port of the crossbar. Each crossbar port implements a ring which serves to connect the crossbar, the local processor(s) and the memory in such a way that the processors have the lowest latency to make requests to the crossbar and memories have the lowest latency to receive a request from the crossbar.

This is accomplished by designing a dual crossbar port having separate crossbar mechanisms for responses and for requests. This structure assures that deadlocks do not occur in the system.

Viewing each of the crossbar ports independently, the request crossbar has five ports on it. Four of the ports are dedicated to memory and processor(s) with one port dedicated to the I/O system.

Each memory/processor port has a ring associated with it. The ring has a memory controller, a processor's agent and the crossbar port associated with it so that a processor, when it makes a request, the request goes directly to the crossbar. If a memory wants to make a request to that port, the request goes from the memory controller through the processor's agent to the crossbar port. A request that wants to go to a memory will go directly from the crossbar to memory controller. If a request is to go to a processor, it would go from the crossbar, through memory, to the processor. This topology actually implements a ring which moves data easily among the elements showing a port. The ports are interconnected via the crossbar. The different nodes, if any, are interconnected by another ring which is controlled by the network interconnect controller which does the switching between the nodes.

Another feature of our system is the manner in which the multi-casting mechanism is implemented. Within the crossbar, for example, for the request part of the crossbar, assume a processor makes a request to the crossbar which can either be multi-casted or sent out individually to other processors connected to the local crossbar by one or more of the rings. The local crossbar would store the information request in a buffer and that buffer is then multi-casted to the other output ports of the crossbar which go to all the other rings so that the request can go to the other rings independently. Thus, if one of the rings is busy, the other rings can still handle the message (assuming a multi-casted message) and when the busy ring is free it can then receive the multi-casted message as well.

One of the objectives of our system, as discussed above, is that it have the ability to handle long latency requests while not increasing the latency of shorter latency requests. This occurs typically in a shared multi-processor system when all operations go to the memory local on that node. What typically happens is that all operations are served in a first-come, first-serve order. Thus, if the I/O wants to make a request to memory and the processor also wants to make a request, whichever request actually arrives at memory first would be serviced first.

In a system as we have designed, where some of the requests go to local memory and some of the requests go to remote memory, if the requests are served in a strict first-come, first-serve order, a remote memory having a long latency would tie up the short latency requests behind it until the long latency request had finished.

The solution that we designed into our system is to send all requests to the local memory controller. The local memory controller checks to see if the network interconnect: controller (NIC) is currently busy; if it is, the request is put in a resend queue. The requests in the resend queue are removed one at a time as the NIC becomes available. The information put in the resend queue is the minimum amount of information required to send a resend message to the original processor's agent so the entire request can be resent again.

The I/O ports of the crossbar have the ability to send a request which informs the local memory controller as to how many requests it has which need to be sent by the NIC. This essentially allows the I/O system to put multiple requests in the resend queue with a single request to the local memory controller. The local memory controller can then issue resend responses to the I/O unit as the NIC becomes available.

The sequence would be that the I/O system sends a header saying that we have 16 transfers to make. The memory system will then operate on each transfer independently. As resources become available for the first transfer, the memory system will resend a response back to the I/O system telling the I/O system it can send one of the transfers. When the memory has completely processed that one transfer, it will send another message back to the I/O system saying "you can send your second transfer." This sequence will continue until the entire 16 transfers have been dealt with by memory. At that point the I/O system could then send an additional header that says in effect "I'm going to send 16 more transfers."

The resend mechanism which we implemented does not actually decrease the latency for a single request. However, a normally running system will be able to handle many more requests simultaneously resulting in higher bandwidth and lower latency per request.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Before beginning the detailed discussion of our system operation, a complete system architecture, which is our best mode of operation, is shown in detail in Exemplar Architecture Convex part number 081-023430-000, available from Convex Computer Corporation, 3000 Waterview Parkway, Richardson, Tex. 75080, which document is hereby incorporated by reference herein.

Figure 1:
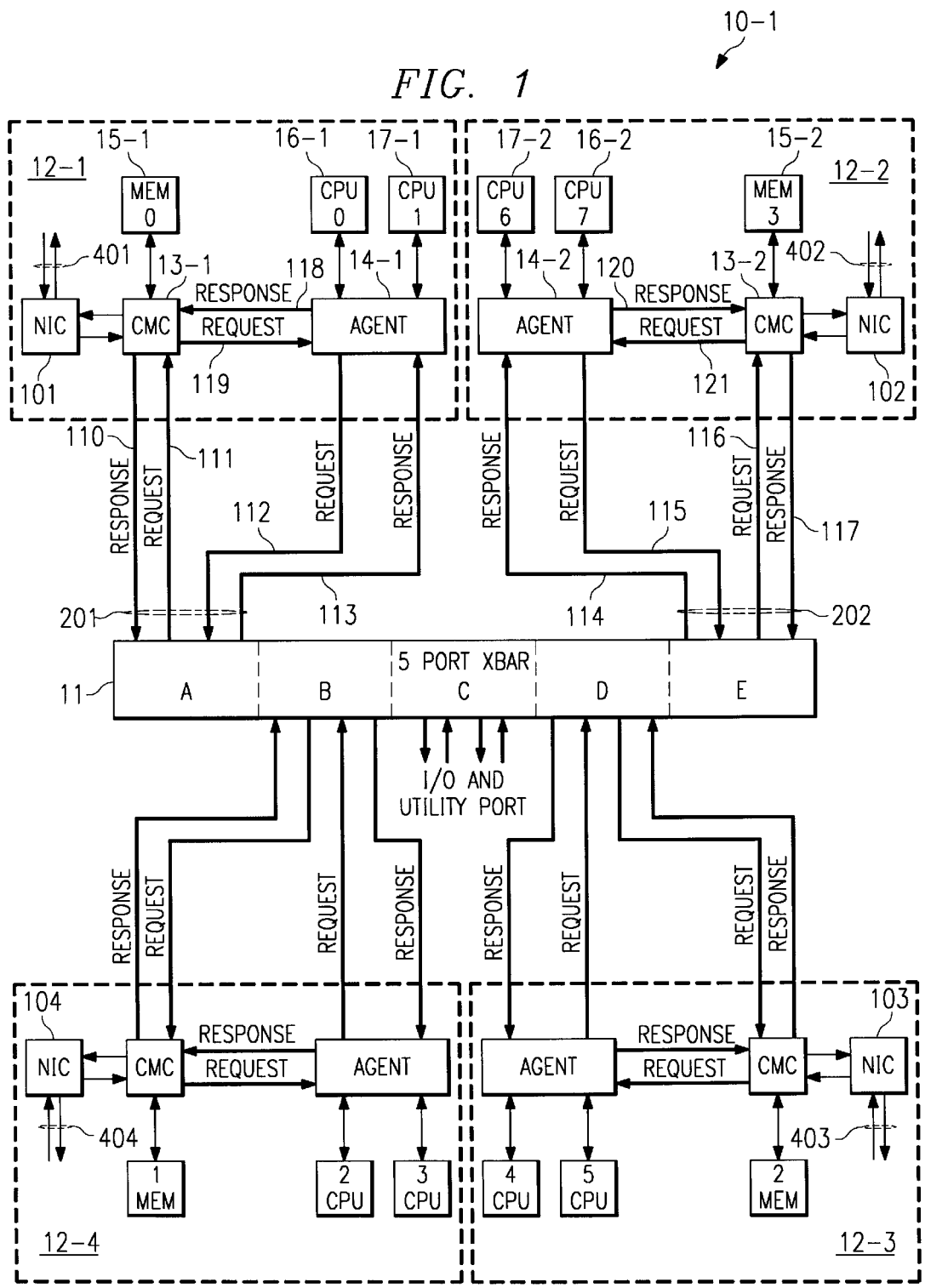
FIG. 1 shows the topology for a single node of a shared multi-processor system.

Turning now to FIG. 1 there is shown node 10-1 which contains the topology for a single node of a shared multiprocessor system. Contained within node 10-1 is crossbar 11 which, in the embodiment shown, has five ports, A through E. Each port connects a single memory processor pair, such as memory/processor unit 12-1, to other ports of crossbar 11. Contained within memory/processor unit 12-1 is coherent memory controller (CMC) 13-1. CMC 13-1 is responsible for fielding incoming requests and accessing memory 15-1. Once a CMC accesses its associated memory, it then determines what operation it is to perform on memory. For example, a request could be a read memory request or a write memory request.

Figure 4:
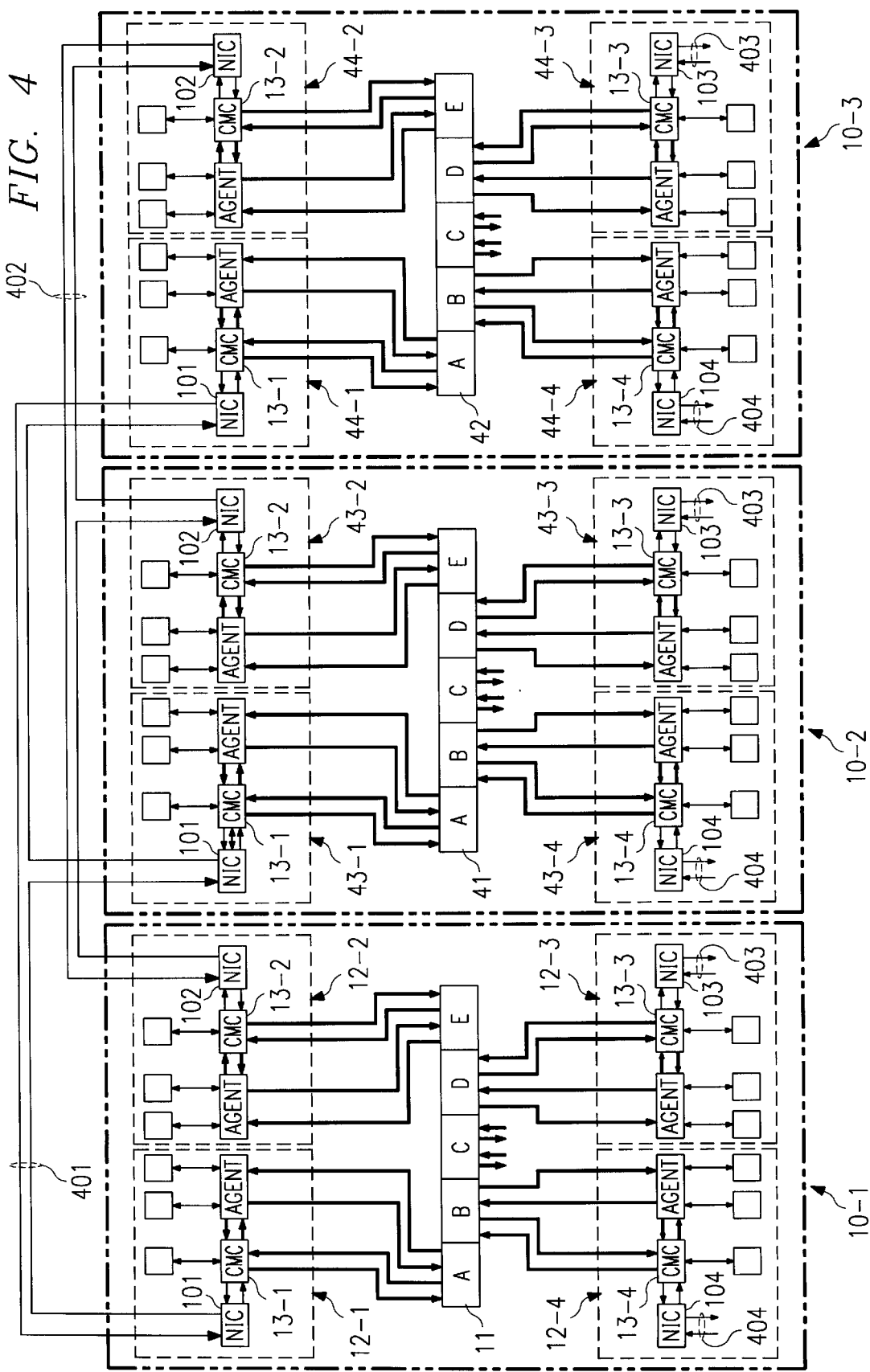
FIG. 4 shows a typical interconnection using multiple links in a three-node system.

Also associated with coherent memory controller 13-1 is ring controller 101 which serves to interface node 10-1 with a node from the next crossbar via ring 401. FIG. 4 shows a three node system but larger numbers of nodes can be connected together. In a preferred environment the system would have 16 such nodes.

Within the system, as shown in FIGS. 1 and 4, there are 4 rings labeled 401, 402, 403 and 404. These rings are striped across the nodes and provide both an increase in bandwidth and a higher level of availability. Higher bandwidth results from having multiple rings for remote memory accesses to proceed independently. Higher availability results from the ability to deconfigure a faulty ring while allowing the remaining rings to handle the memory accesses. Item 101 is node 10-1's controller for accesses to remote memory.

Operation of the rings can be as described in IEEE Standard 1596-1992 called the Scalable Coherent Interface, which is hereby incorporated by reference herein.

Memory/processor unit 12-1 (unit) also contains agent 14-1 (processor agent) which is responsible for fielding requests from CPUs 16-1 and 17-1 and for translating memory requests from them into requests that go out across internal bus 112 to crossbar 11, port A.

Within unit 12-1 there are connections 118 and 119 between CMC 13-1 and agent 14-1; one connection (119) is for requests that go to the CMC and the other (118) is for requests that go to the agent. The agent forwards these requests, as well as requests initiated by one of its CPUs, to crossbar 11, port A. Also, agent 14-1 passes responses from CPU0 (or CPU1) or from the crossbar, via connection 118 to CMC 13-1. The CMC also can pass responses via connection 110 to the crossbar and it can receive requests via connection 111.

Processor/memory unit 12-1 is replicated four times (12-1, 12-2, 12-3, 12-4) in the system and each is connected to a separate port (A, B, D, E) of the crossbar. The fifth port of the crossbar is connected to the I/O utility system which interfaces a utility board, the function of which will be discussed hereinafter.

Figure 2:
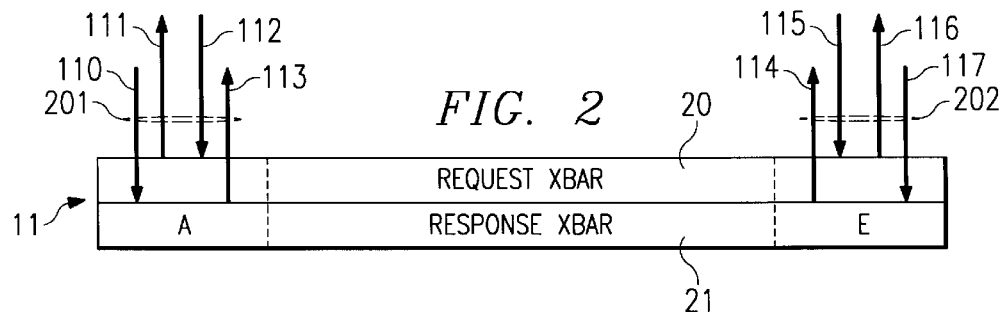
FIG. 2 shows the links associated with two of the five ports of a multi-ported dual crossbar of the multi-processor system.

Turning now to FIG. 2, crossbar 11 (shown in FIG. 1 as a single element) is in reality two crossbars, 20 and 21, one being for requests and one being for responses. Requests between an associated processor/memory unit and its crossbar port always go to the same request crossbar 20, and responses flow to and from response crossbar 21. As will be seen, never are the two data paths interconnected in any way, so that requests will never deadlock responses in the system.

Figure 3:
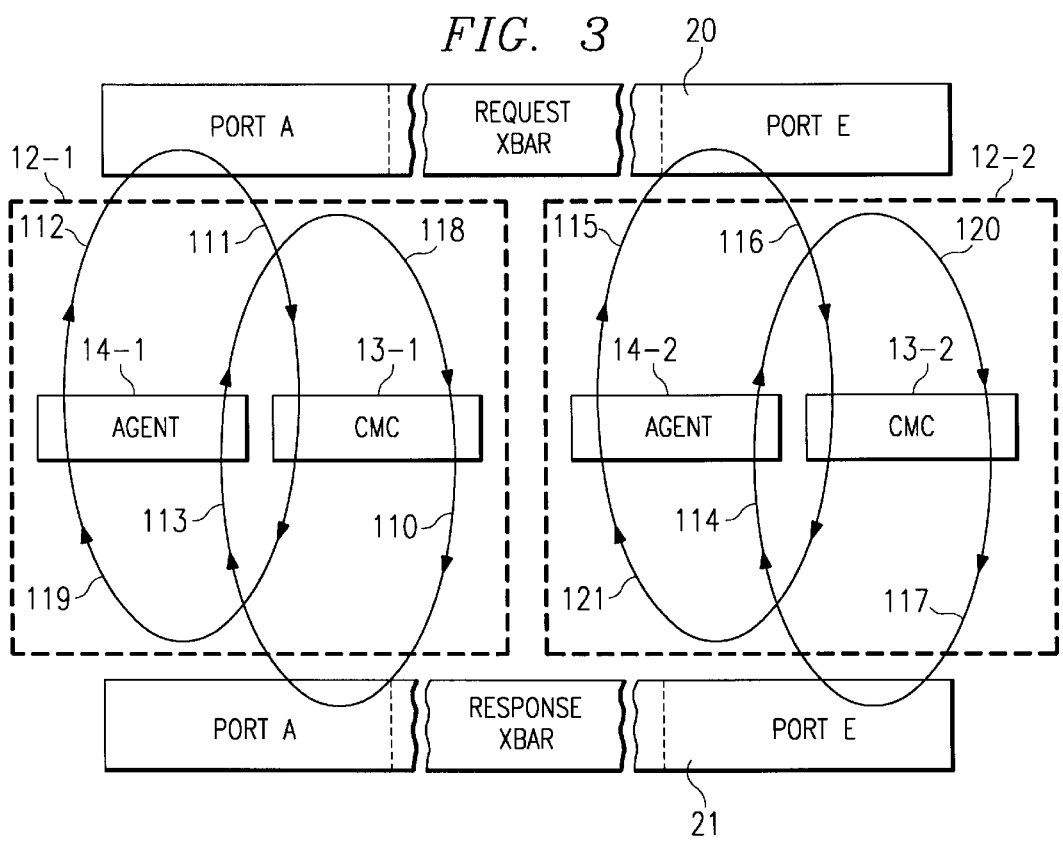
FIG. 3 shows two processor/memory units connected through the separate request and response links of the dual crossbar system.

Turning to FIG. 3, there is shown a schematic version of the two portions, 20 and 21, of crossbar switch 11 combined with a data flow diagram. Only two of the processor/memory unit (12-1 and 12-2) are shown, but the flow paths would be the same for the other processor/memory units.

As shown in FIG. 3, the responses and the requests connected to a port actually form a ring with the crossbar switches integrated to the rings. As shown, processor/memory unit 12-1 is connected to port A which is split into two portions, the request portion and the response portion. Processor/memory unit 12-2 is similarly connected to port E, also split into two sections.

To follow an example transaction through, the transaction for operations within unit 12-1 could start with CPU0 (16-1) making a request to agent 14-1. Agent 14-1 would then send the request out on bus 112, which would go to request crossbar 20, port A. At that point the crossbar which reads address information contained within the data, as will be discussed with respect to FIG. 6, would connect to the correct destination's memory port. For this discussion let us assume it is port E. The request would then flow through crossbar 11 to bus 116 to memory controller 13-2. Coherent memory controller 13-2 would then access the target memory, which would be memory 15-2 (shown in FIG. 1) within processor/memory unit 12-2. CMC 13-2 would then get a response back from memory 15-2 and would send back to crossbar portion 21 via bus 117. The crossbar would then switch the responses packet through the crossbar to port A, which would forward the response over bus 113 back to agent 14-1 for delivery to CPU 16-1 (FIG. 1).

With respect to FIG. 3, there are several problems solved with this arrangement. One of the problems was having memory able to make a request to a processor as well as the normal case where the processor makes requests to the memory. We have just described the situation where a processor makes a request to memory. In going the other direction, when a memory makes a request, first the request comes in over ring 401 (FIG. 1) to controller 101. This request is transferred to coherent memory controller 13-1 (FIG. 3), which in turn passes the request to agent 14-1 using bus 119. Agent 14-1 passes the request on, as it did in the previous example, to the crossbar using bus 112. As before, the request would arrive at CMC 13-2 using bus 116 and would be forwarded to agent 14-2 over bus 121. The return response follows a path back from Agent 14-2 using bus 120 to CMC 13-2 and back to crossbar 21, port E, using bus 117. The response is switched through crossbar 11 to port A and then to agent 14-1 over bus 113, arriving back at CMC 13-1 over bus 118. CMC 13-1 sends the packet to NIC 101 (FIG. 1) back for transmission over ring 401. This is the path for a long latency request as well as for a short latency request.

This design not only allows the system to optimize the within-node request going from a processor to memory, but also allows memory to issue a request to other processors within the system. Note that because of the various rings this becomes a non-blocking network.

FIG. 4, as discussed above, shows the interconnect between multiple nodes 10-1, 10-2 and 10-3. The interesting point of this figure is the interconnect between the NIC controllers on each node. NIC controller 101 of node 10-1 is connected to NIC controller 101 of node 10-2 using interconnect bus 401. If there are just two nodes, the ring is formed from using one data path from node 10-1 to 10-2 and another data path from 10-2 back to 10-1. If, as shown, a third node (or more) is put in place then node 10-1 is connected to node 10-2, and node 10-2 is connected to node 10-3, and node 10-3 is connected back to node 10-1. The NIC controller bus forms a ring and is thus connected to just two nodes.

Figure 5:
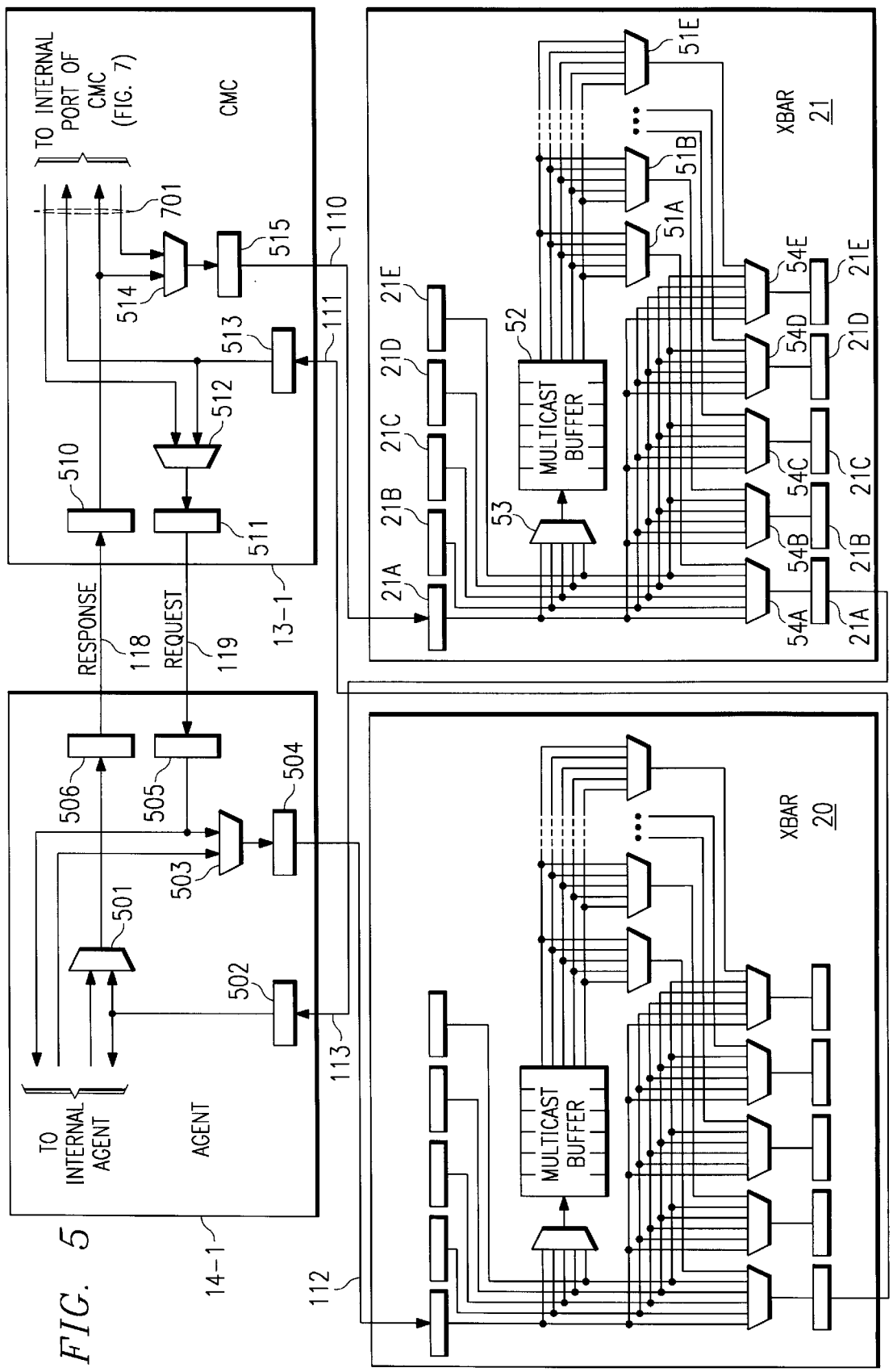
FIG. 5 shows the interconnect circuitry for an agent, a coherent memory controller, and the dual crossbar.

Turning now to FIG. 5, we will discuss the details of the interconnection circuitry. Agent 14-1 can act as either a pass through for requests and responses or the agent can be the source or destination for requests or responses.

When agent 14-1 is acting as a pass through for a request packet, the data on link 119 is staged in register 505, selected by mux 503, registered by 504 and passes out of the agent on link 112.

A response passing through agent 14-1 enters on link 113, is staged in register 502, selected by mux 501, staged again by register 506 and exits agent 14-1 on link 118.

A request generated by agent 14-1 is routed to Xbar (crossbar) 20. The request is first selected by mux 503, staged by register 504, and sent to Xbar 20 on link 112.

A request received by agent 14-1 enters by link 119, is staged by register 505, and is then available for internal use.

When the agent receives a response, it enters the agent via link 113, is staged by register 502, and is then available to the internal logic.

The last case is when the agent sources a response. The response is generated by the agent's internal logic, is selected by mux 501, staged by register 506, and leaves the agent on link 118.

CMC 13-1 behaves similarly to agent 14-1 in that requests and responses can pass through the CMC or the CMC can be the source or destination for requests and responses.

Figure 6:
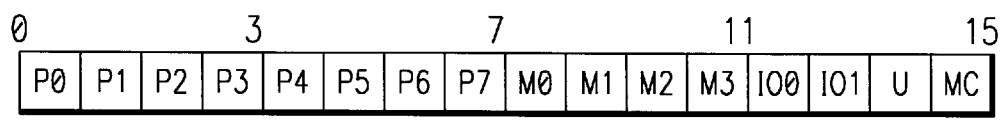
FIG. 6 is a diagram depicting a typical packet bit stream routing word.

Turning for a moment to FIG. 6, there is shown the format of the first word of every packet of data which is transferred over the links previously described in FIG. 5. The first word is used as the routing word and specifies the destination for the remainder of the packet. The possible destinations within a hypernode are processors "P0" through "P7," memories "M0" through "M3," I/O units "IO0," and the utility processor "U." The routing word also specifies whether multiple processor destinations are required with the "MC" bit (multi-cast).

Returning now to FIG. 5, agents may set a single route word bit indicating a request is to go to a single CMC, or to the I/O or utility board. Agent may also set multiple processor bits, indicating that the request is to go to multiple processor destinations. If the agent sets multiple processor bits, it must also set the multi-cast bit indicating that the data is to go to multiple destinations. The crossbar interprets the multi-cast bit to mean that the packet must be stored in multi-cast buffer 52, then resent out using muxes 51-A through 51-E and 54-A through 54-E to the appropriately selected destination registers, which are registers 21-A through 21-B, controlled by the bits within the routing word.

Each packet is made up of from two words to thirty-six words, depending on if the route (destination) word and only one control word is passed, or if the route word and an entire 64 byte data packet (the working data) is being transmitted.

The method described is a generic method of routing information through the topology shown. The routing word is specific in that it specifies the destination, but all data that follows can be in any format. It is just a method of delivering that data to the destination that this invention is concerned with.

Figure 7:
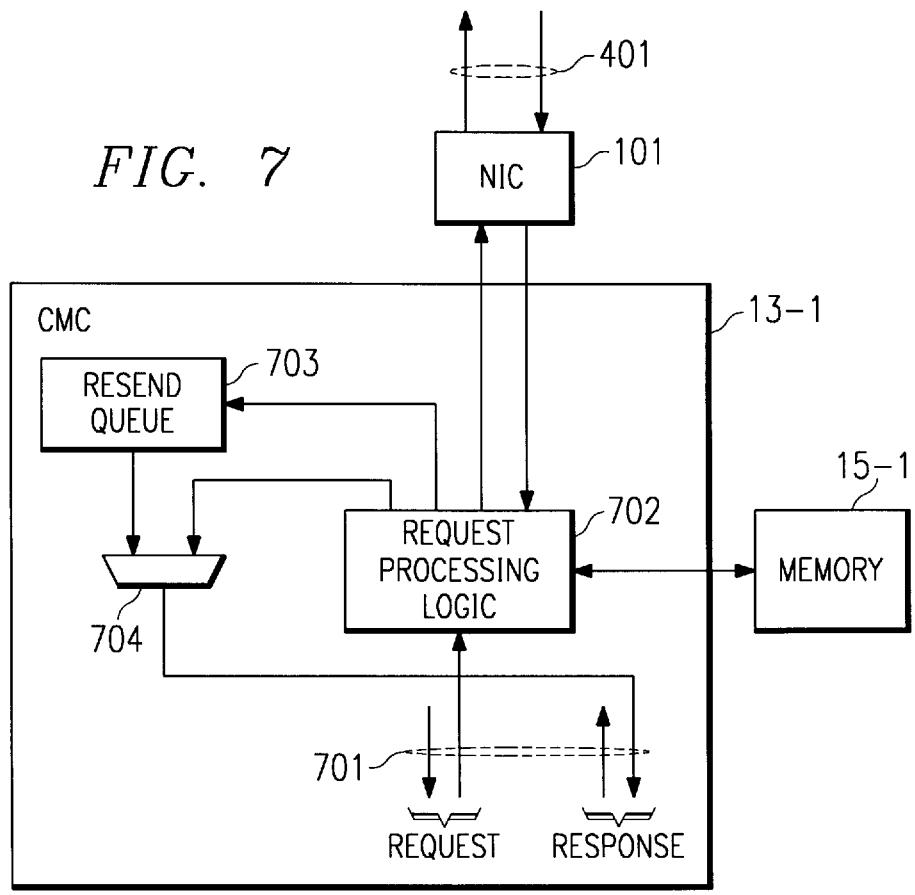
FIG. 7 shows the details of the coherent memory controller related to the resend mechanism for long latency requests.

Continuing, in FIG. 7, there is shown the details of memory 13-1 to show the method used for communication of packets to remote nodes via ring 401. CMC 13-1 requests are brought in over bus 701 to request processing logic 702. Logic 702 accesses data from memory 15-1 if the data which is needed is in cache in (local) memory 15-1. In this situation the request can be immediately serviced and the response will be returned through mux 704 back to the crossbar using bus 701.

If, however, the request or a portion of the request, cannot be completed, then the request processing logic must access a remote node using NIC controller 101. This means that the system must wait for the response to come back. Once that response comes back, it is then written into memory 15-1, and the response again is sent back using mux 704 and bus 701.

If, when request processing logic 702 attempts to make a request to NIC 101, if that device is already servicing another request, rather than backing up all requests wanting to be processed, request processing logic 702 will transfer the source and transaction ID of the sending request (but not the full data) into resend queue 703. The requesting address will stay in queue 703 until NIC 101 becomes available. At that point, resend queue local 703 sends a resend response back to the originating agent using mux 704 and bus 701. The originating agent will then send the entire request back to the request processor logic. At that point NIC 101 is available to take the request and send it to the remote node. Thus, resend queue 703 is used to temporarily hold requests that cannot be serviced immediately so that those (long latency) requests do not back up across bus 701. This protects the system so that low latency requests that do not need to go across the NIC 101 device are not inhibited from being serviced immediately.

The information in resend queue 703 consists of a source number and a transaction identification number (TID). This information is sufficient to identify the source of the original request (which processor or I/O unit sent the request), and the TID is used by the agent and I/O unit to identify which request packet is to be resent. The current implementation saves six bits of information per request in the resend queue, with a depth of 32 entries. This allows for part of the information to go across the communication level in situations where the entire body of data could not be sent due to busy conditions of the link.

Although the present invention and its advantages have been described in detail, it should be understood that various changes, substitutions and alterations can be made herein without departing from the spirit and scope of the invention as defined by the appended claims.

What is claimed is:

1. A multiprocessor system having a plurality of nodes, each node having local processing and shared, coherent memory capabilities organized into units, said system operable such that the processor or the memory from any unit can access the processor or the memory from any other unit, said system comprising:

a first switch for interconnecting a plurality of said memory and processors from a plurality of said units, said switch having first and second subswitches, each said subswitch operable independent of each other, said switch and subswitches replicated along crossbar ports with each port associated with a particular memory and processor unit, said switch including dual unidirectional communication connections between said memory capability via a coherent memory controller of said associated unit and said associated port, one direction of said dual unidirectional communication being with said first subswitch of said associated port and the other direction of said dual unidirectional communication being with said second subswitch of said associated port and including unidirectional communication connections between said processor capability of said associated unit and said associated port, one direction of said dual unidirectional communication being with said first subswitch of said associated port and the other direction of said dual unidirectional communication being with said second subswitch of said associated port; and means, using said dual unidirectional connections, for effecting bidirectional communication capability between said memory via said coherent controller and said processing capabilities, wherein the one direction is for communicating, certain requests and the other direction is for communicating certain responses.

2. The system set forth in claim 1 further comprising a plurality of other nodes not connected to said first switch, each node having local processing and memory capabilities also organized into units, said system operable such that the processor or memory from any node can access the processor or memory from any other node;

at least one other switch for interconnecting a plurality of said other units within its node, said switch having first and second subswitches, each said subswitch operable independent of each other, said switch and subswitches divided into ports with each port associated with a particular one of said other units of said other nodes, said system further including a unidirectional communication ring between said memory capability of a first node associated with said first switch and said memory capabilities of a second node associated with a second one of said other switches.

3. The system set forth in claim 2 further including means for controlling memory access in response to obtained memory access request data;

means, including said ring and a ring controller, for directing certain obtained memory access requests over said ring to said remote memory;

means jointly responsive to an obtained memory access request directed to a remote memory and to a determined unavailability of said ring controller for storing at said memory controlling means only a portion of said obtained memory access request data; and means operative in response to the availability of said ring controller for utilizing said stored portion of said obtained memory access to obtain a retransmission of the full memory access request associated therewith.

4. The system set forth in claim 3 wherein said ring includes a plurality of independently operating rings, each connecting a separate one of said remote memories.

5. The system set forth in claim 1 wherein said switch further includes means for simultaneously communicating over said dual unidirectional communication connections from a sending one of said ports to a selected plurality of said other ports.

6. The system set forth in claim 5 wherein said communication is effected under control of a packet of information communicated from sending ones of said units, said packet containing address information as well as working data, said packet also containing bits which control said simultaneous communication.

7. The system set forth in claim 1 wherein said communication is effected under control of a packet of information communicated from sending ones of said units, said packet containing address information as well as working data.

8. The method of communicating between a shared coherent memory and a processor in a computer system, said method comprising the steps of:

communicating certain requests from said memory to said processor over a first unidirectional communication link via a coherent memory controller;

communicating certain responses from said processor to said memory over a second unidirectional communication link via said coherent memory controller;

communicating certain requests from said processor to a switching device over a third unidirectional communication link;

communicating certain requests from said switching device to said memory via said coherent memory controller over a fourth unidirectional communication link;

communicating certain responses from said memory via said coherent memory controller to said switching device over a fifth unidirectional communication link; and communicating certain responses from said switching device to said processor over a sixth communication link.

9. The method set forth in claim 8 further including a plurality of additional memory and processing unit pairs attached to said switching device, said method further including the steps of communicating certain requests from said memory to said processor over a first unidirectional communication link operating only between each said memory and processing pairs;

communicating certain responses from said processor to said memory over a second unidirectional communication link operating only between each of said memory and processing pairs;

communicating certain requests from said processor to a switching device over a third unidirectional communication link operating between each said memory and processing pair and a port of said switching device;

communicating certain requests from said switching device to said memory over a fourth link operating between each said memory and processing pair and a port of said switching device;

communicating certain responses from said memory to said to said switching device memory device over a fifth unidirectional communication link operating between each said memory and processing pair and a port of said switching device; and communicating certain responses from said switching device to said processor over a sixth unidirectional communicating link operating between each said memory and processor pair and a port of said switching device.

10. The method set forth in claim 9 further including a plurality of additional memory and processing unit pairs arranged in a circular chain, said method further including the steps of exclusively communicating with said additional memory and processing pairs over a circular link connecting said chain such that communication requests from a coherent memory controller of one pair are transmitted to a coherent memory controller of a memory located in a next such pair of said chain.

11. The method set forth in claim 8 wherein the routing through said switch device is controlled by address information contained within each communication request or response.

12. The method set forth in claim 8 further including the steps of dividing memory requests into long latency and short latency requests;

attempting to perform long latency requests as they occur;

storing, in response to an indication that a communication path over which a long latency request is targeted is currently unable to immediately handle that request, in a local buffer a data packet pertaining to said long latency request; and resending from said buffer said stored packet in response to an indication that said long latency communication path is currently available.

13. The method of communication among a plurality of individual computing units, said units arranged as memory/processor pairs and said unit pairs interconnected via separate ports by a switch, said method comprising the steps of delivering a data packet from a unit processor to a request portion of said switch;

delivering a data packet from said request portion of said switch to a unit memory;

delivering a data packet from a unit memory to said response portion of said switch;

delivering a data packet from a response portion of said switch to a unit processor; and communicating data packets between a unit memory and a unit processor within each said computing unit without communicating said data packets to said switch.

14. The method set forth in claim 13 further including the step of:

interchanging data packets among said computing units and a plurality of other similar computing units, said interchange occurring over a link independent of said above-described switch and between an individual one of said computer units and a unique one of said other computing units.

* * * * *